United States Patent
Asano et al.

(10) Patent No.: US 10,586,653 B2
(45) Date of Patent: Mar. 10, 2020

(54) MULTILAYER CERAMIC ELECTRONIC COMPONENT INCLUDING ORGANIC LAYERS

(71) Applicant: Murata Manufacturing Co., Ltd., Nagaokakyo-shi, Kyoto-fu (JP)

(72) Inventors: Hiroshi Asano, Nagaokakyo (JP); Nobuyasu Hamamori, Nagaokakyo (JP); Koji Matsushita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 122 days.

(21) Appl. No.: 15/708,476

(22) Filed: Sep. 19, 2017

(65) Prior Publication Data
US 2018/0082789 A1 Mar. 22, 2018

(30) Foreign Application Priority Data
Sep. 20, 2016 (JP) .................. 2016-183310

(51) Int. Cl.
*H01G 4/30* (2006.01)
*H01G 4/232* (2006.01)
(Continued)

(52) U.S. Cl.
CPC ............... *H01G 4/30* (2013.01); *H01G 2/10* (2013.01); *H01G 2/14* (2013.01); *H01G 4/14* (2013.01);
(Continued)

(58) Field of Classification Search
CPC ........ H01G 4/2325; H01G 4/232; H01G 4/12; H01G 4/30; H01G 4/005
See application file for complete search history.

(56) References Cited

U.S. PATENT DOCUMENTS

| 6,171,644 B1* | 1/2001 | Jinno | ............. H01C 1/034 427/79 |
| 2007/0254799 A1* | 11/2007 | Kaneda | ........... C04B 35/4682 501/139 |

(Continued)

FOREIGN PATENT DOCUMENTS

| JP | 2010-109238 A | 5/2010 |
| JP | 2010-278373 A | 12/2010 |

(Continued)

OTHER PUBLICATIONS

Asano et al., "Multilayer Ceramic Electronic Component," U.S. Appl. No. 15/708,462, filed Sep. 19, 2017.

(Continued)

*Primary Examiner* — David M Sinclair
(74) *Attorney, Agent, or Firm* — Keating & Bennett, LLP

(57) ABSTRACT

A multilayer ceramic electronic component includes a first organic layer located on both principal surfaces and both side surfaces in contact with a first external electrode, and a second organic layer located on the both principal surfaces and the both side surfaces in contact with a second external electrode. The first organic layer includes an organic silicon compound and covers an end of a first base electrode layer of the first external electrode, and the second organic layer includes an organic silicon compound and covers an end of a second base electrode layer of the second external electrode. A first plating layer of the first external electrode includes an end in contact with the surface of the first organic layer, and a second plating layer of the second external electrode includes an end in contact with the surface of the second organic layer.

14 Claims, 7 Drawing Sheets

(51) Int. Cl.
  *H01G 4/12*   (2006.01)
  *H01G 2/10*   (2006.01)
  *H01G 2/14*   (2006.01)
  *H01G 4/14*   (2006.01)
  *H01G 4/005*  (2006.01)

(52) U.S. Cl.
  CPC ............. *H01G 4/232* (2013.01); *H01G 4/005* (2013.01); *H01G 4/12* (2013.01)

(56) References Cited

U.S. PATENT DOCUMENTS

| | | | | |
|---|---|---|---|---|
| 2010/0290172 | A1* | 11/2010 | Motoki | H01G 4/232 361/305 |
| 2010/0302704 | A1 | 12/2010 | Ogawa et al. | |
| 2014/0085767 | A1* | 3/2014 | Kang | H01G 4/12 361/301.4 |
| 2015/0325369 | A1* | 11/2015 | Inoue | H01C 17/02 336/200 |
| 2016/0027585 | A1 | 1/2016 | Inoue et al. | |

FOREIGN PATENT DOCUMENTS

| | | | | |
|---|---|---|---|---|
| JP | 2015029009 A | * | 2/2015 | |
| JP | 2016-031992 A | | 3/2016 | |
| WO | WO-2014119564 A1 | * | 8/2014 | ............. H01C 17/02 |

OTHER PUBLICATIONS

Asano et al., "Multilayer Ceramic Electronic Component," U.S. Appl. No. 15/708,464, filed Sep. 19, 2017.
Hamamori et al., "Multilayer Ceramic Electronic Component," U.S. Appl. No. 15/708,469, filed Sep. 19, 2017.
Asano et al., "Multilayer Ceramic Electronic Component," U.S. Appl. No. 15/708,474, filed Sep. 19, 2017.

* cited by examiner

MULTILAYER CERAMIC ELECTRONIC COMPONENT INCLUDING ORGANIC LAYERS

CROSS REFERENCE TO RELATED APPLICATIONS

This application claims the benefit of priority to Japanese Patent Application No. 2016-183310 filed on Sep. 20, 2016. The entire contents of this application are hereby incorporated herein by reference.

BACKGROUND OF THE INVENTION

1. Field of the Invention

The present invention relates to a multilayer ceramic electronic component such as a capacitor, an inductor, and a resistor, and a method for manufacturing the multilayer ceramic electronic component.

2. Description of the Related Art

Conventionally, multilayer ceramic electronic components such as capacitors, inductors, and resistors have been used for various electronic devices.

In general, these electronic components each have two principal surfaces opposite in the laminating direction, two side surfaces opposite in the width direction perpendicular to the laminating direction, and two end surfaces opposite in the length direction perpendicular to the laminating direction and the width direction.

Two or more external electrodes are provided on the outer surface of the laminated body. The external electrodes are each formed on the end surfaces and portions of the principal surfaces, the end surfaces and portions of the side surfaces, or the end surfaces and portions of the side surfaces and principal surfaces. The external electrodes have a substantially U-shaped or substantially L-shaped cross section in the laminating direction.

Such a multilayer ceramic electronic component is mounted on a substrate by electrically connecting portions of the respective external electrodes, formed mainly on the principal surfaces or the side surfaces, to lands of a substrate with a joint material such as a solder interposed therebetween.

However, when the substrate of the mounted structure is warped by a thermal shock or the like, a stress based on the warp propagates, through the lands, the joint material, and the external electrodes, to the laminated body, thus causing the ceramic portion and the internal electrode portion of the laminated body to have cracks, deformations, or the like generated. As a result, this will cause a decrease in performance or a decrease in reliability in the multilayer ceramic electronic component.

Therefore, Japanese Patent Application Laid-Open No. 2010-109238 discloses wraparound portions of external terminal electrodes respectively provided with leading-end spaced portions spaced from principal surfaces of a ceramic body, in order to prevent the ceramic body from being cracked by the stress mentioned previously.

However, the wraparound portions of the external terminal electrodes in Japanese Patent Application Laid-Open No. 2010-109238 respectively have base end-side joint portions joined to the principal surfaces of the ceramic body. Accordingly, there is concern that the stress will propagate to the ceramic body through the base end-side joint portions and the external terminal electrodes, and it has been difficult to suppress cracks.

SUMMARY OF THE INVENTION

Preferred embodiments of the present invention provide multilayer ceramic electronic components which are able to, when a substrate is warped by a thermal shock or the like with the component mounted on the substrate, significantly reduce or prevent the propagation of a stress based on the warp to a laminated body, thus preventing cracks, and a manufacturing method therefor.

A multilayer ceramic electronic component according to a preferred embodiment of the present invention includes a laminated body including a plurality of laminated dielectric layers and a plurality of laminated internal electrodes, the laminated body including a first principal surface and a second principal surface opposite in a laminating direction, a first side surface and a second side surface opposite in a width direction perpendicular or substantially perpendicular to the laminating direction, and a first end surface and a second end surface opposite in a length direction perpendicular or substantially perpendicular to the laminating direction and the width direction, a first external electrode electrically connected to the internal electrodes, and located on the first end surface, with an end extending on the first principal surface, the second principal surface, the first side surface, and the second side surface, a second external electrode electrically connected to the internal electrodes, and located on the second end surface, with an end extending on the first principal surface, the second principal surface, the first side surface, and the second side surface, a first organic layer located on the first principal surface, the second principal surface, the first side surface, and the second side surface, in contact with the first external electrode, and a second organic layer located on the first principal surface, the second principal surface, the first side surface, and the second side surface, in contact with the second external electrode, the first external electrode including a first base electrode layer including a conductive metal and a glass component, and a first plating layer located on the first base electrode layer, the second external electrode including a second base electrode layer including a conductive metal and a glass component, and a second plating layer located on the second base electrode layer, the first organic layer including an organic silicon compound, covering at least an end of the first base electrode layer of the first external electrode, the second organic layer including an organic silicon compound, covering at least an end of the second base electrode layer of the second external electrode, an end of the first plating layer of the first external electrode in contact with the surface of the first organic layer, and an end of the second plating layer of the second external electrode in contact with the surface of the second organic layer.

In addition, in a multilayer ceramic electronic component according to a preferred embodiment of the present invention, preferably, the dimension in the length direction is about 5 μm or more and about 100 μm or less from a leading end of the first base electrode layer on the first organic layer covering the end of the first base electrode layer of the first external electrode to a leading end of the first organic layer closer to the first end surface, and the dimension in the length direction is about 5 μm or more and about 100 μm or less from a leading end of the second base electrode layer on the second organic layer covering the end of the second base electrode layer of the second external electrode to a leading end of the second organic layer closer to the second end surface.

Furthermore, in a multilayer ceramic electronic component according to a preferred embodiment of the present invention, the first organic layer extends from the end of the first base electrode layer of the first external electrode to at least a portion of the surface of the laminated body, and the second organic layer extends from the end of the second base electrode layer of the second external electrode to at least a portion of the surface of the laminated body.

In addition, a multilayer ceramic electronic component according to a preferred embodiment of the present invention further includes a third organic layer located between the first base electrode layer and the first plating layer of the first external electrode, and a fourth organic layer located between the second base electrode layer and the second plating layer of the second external electrode, and the third organic layer covers the first base electrode layer of the first external electrode, with an end of the third organic layer in contact with the surface of the first organic layer, and the fourth organic layer covers the second base electrode layer of the second external electrode, with an end of the fourth organic layer in contact with the surface of the second organic layer.

Furthermore, in a multilayer ceramic electronic component according to a preferred embodiment of the present invention, the first organic layer and the second organic layer are preferably larger in thickness than the third organic layer and the fourth organic layer.

In addition, in a multilayer ceramic electronic component according to a preferred embodiment of the present invention, the third organic layer and the fourth organic layer each preferably includes an organic silicon compound.

Furthermore, in a multilayer ceramic electronic component according to a preferred embodiment of the present invention, at least one of a first set of the first organic layer and the second organic layer, and a second set of the third organic layer and the fourth organic layer includes multifunctional alkoxysilane Si—$(C_nH_{2n+1})_3$.

In addition, a multilayer ceramic electronic component according to a preferred embodiment of the present invention is preferably a multilayer ceramic capacitor.

A method for manufacturing a multilayer ceramic electronic component according to a preferred embodiment of the present invention includes a laminated body including a plurality of laminated dielectric layers and a plurality of laminated internal electrodes, the laminated body including a first principal surface and a second principal surface opposite in a laminating direction, a first side surface and a second side surface opposite in a width direction perpendicular or substantially perpendicular to the laminating direction, and a first end surface and a second end surface opposite in a length direction perpendicular or substantially perpendicular to the laminating direction and the width direction, a first external electrode electrically connected to the internal electrodes, and located on the first end surface, with an end extending on the first principal surface, the second principal surface, the first side surface, and the second side surface, and a second external electrode electrically connected to the internal electrodes, and located on the second end surface, with an end extending on the first principal surface, the second principal surface, the first side surface, and the second side surface, the first external electrode including a first base electrode layer including a conductive metal and a glass component, and a first plating layer located on the first base electrode layer, the second external electrode including a second base electrode layer including a conductive metal and a glass component, and a second plating layer located on the second base electrode layer, and a plurality of organic layers that cover at least portions of the surfaces of the first base electrode layer of the first external electrode, the second base electrode layer of the second external electrode, and the laminated body, the method includes the steps of preparing the laminated body, forming the first base electrode layer of the first external electrode and the second base electrode layer of the second external electrode by applying a conductive paste to the laminated body and baking the conductive paste, forming the organic layers by applying an organic process liquid to the surface of the first base electrode layer of the first external electrode, the surface of the second base electrode layer of the second external electrode, and the surface of the laminated body, or immersing the surfaces in the organic process liquid, and forming the first plating layer of the first external electrode and the second plating layer of the second external electrode by plating on the organic layers. The step of forming the organic layers is performed by applying the organic process liquid in two batches, with the first organic process liquid being different from the second organic process liquid.

In addition, in a method for manufacturing a multilayer ceramic electronic component according to a preferred embodiment of the present invention, the first organic process liquid and the second organic process liquid each preferably includes an organic silicon compound.

Furthermore, in a method for manufacturing a multilayer ceramic electronic component according to a preferred embodiment of the present invention, the first organic process liquid is a monofunctional organic process liquid, and the second organic process liquid is an organic process liquid of multifunctional alkoxysilane Si—$(C_nH_{2n+1})_3$.

In a multilayer ceramic electronic component according to a preferred embodiment of the present invention, the first organic layer including an organic silicon compound covers at least the end of the first base electrode layer of the first external electrode, and the second organic layer including an organic silicon compound covers at least the end of the second base electrode layer of the second external electrode, and the end of the first plating layer of the first external electrode makes contact with the surface of the first organic layer, and the end of the second plating layer of the second external electrode makes contact with the surface of the second organic layer, and thus, if a substrate is warped by a thermal shock or the like with the multilayer ceramic electronic component mounted on the substrate, a stress based on the warp is able to cause delamination between the first base electrode layer and the first plating layer of the first external electrode and delamination between the second base electrode layer and the second plating layer of the second external electrode. Therefore, the stress is dispersed, thus making it possible to significantly reduce or prevent cracking, deformation, or like in the ceramic portion and the internal electrode portion of the multilayer ceramic electronic component. As a result, the reliability of the multilayer ceramic electronic component is able to be significantly improved. The crack is defined as cracking which develops from the outer layer portion toward the internal electrode layer portion with an external electrode end as a starting point.

In addition, in a multilayer ceramic electronic component according to a preferred embodiment of the present invention, when the dimension in the length direction is about 5 μm or more and about 100 μm or less from a leading end of the first base electrode layer on the first organic layer covering the end of the first base electrode layer of the first external electrode to a leading end of the first organic layer closer to the first end surface, and the dimension in the length direction is about 5 µm or more and about 100 µm or less from a leading end of the second base electrode layer on the second organic layer covering the end of the second base electrode layer of the second external electrode to a leading end of the second organic layer closer to the second end surface, cracking of the laminated body is able to be significantly reduced or prevented, and also deviations of the multilayer ceramic electronic component are able to be significantly reduced or prevented.

The deviation of the multilayer ceramic electronic component is defined as a failure in a tombstone shape, or a failure to achieve conduction on a solder-mounted substrate due to deviation from the substrate.

Furthermore, in a multilayer ceramic electronic component according to a preferred embodiment of the present invention, when the first organic layer extends from the end of the first base electrode layer of the first external electrode to at least a portion of the surface of the laminated body, and the second organic layer extends from the end of the second base electrode layer of the second external electrode to at least a portion of the surface of the laminated body, delamination is able to be reliably achieved between the base electrode layers and the plating layers without decreasing solderability.

In addition, when a multilayer ceramic electronic component according to a preferred embodiment of the present invention further includes a third organic layer located between the first base electrode layer and the first plating layer of the first external electrode, and a fourth organic layer located between the second base electrode layer and the second plating layer of the second external electrode, where the third organic layer covers the first base electrode layer of the first external electrode, with an end of the third organic layer in contact with the surface of the first organic layer, and the fourth organic layer covers the second base electrode layer of the second external electrode, with an end of the fourth organic layer in contact with the surface of the second organic layer, delamination is able to be made more likely to be achieved between the first base electrode layer and the first plating layer of the first external electrode, and delamination is able to be made more likely to be achieved between the second base electrode layer and the second plating layer of the second external electrode. Therefore, a stress based on warp generated at the substrate by thermal shocks or the like is further dispersed, thus making it possible to significantly reduce or prevent cracking, deformation, or the like in the ceramic portion and the internal electrode portion of the multilayer ceramic electronic component. As a result, the reliability of the multilayer ceramic electronic component is able to be further significantly improved.

Furthermore, when the first organic layer and the second organic layer are larger in thickness than the third organic layer and the fourth organic layer, a multilayer ceramic electronic component according to a preferred embodiment of the present invention provides easy initiation of delamination between the first base electrode layer and the first plating layer of the first external electrode and delamination between the second base electrode layer and the second plating layer of the second external electrode, thus significantly reducing or preventing subsequent delamination.

As a result, various common problems are able to be significantly reduced or prevented, such as, for example, a fall of the multilayer ceramic electronic component from a substrate.

In addition, a multilayer ceramic electronic component according to a preferred embodiment of the present invention not only significantly reduces or prevents cracking in the laminated body, but also significantly reduces or prevents defective plating as well as deviations of the multilayer ceramic electronic component, when the third organic layer and the fourth organic layer each include an organic silicon compound.

Furthermore, a multilayer ceramic electronic component according to a preferred embodiment of the present invention not only further significantly reduces or prevents cracking in the laminated body, but also significantly reduces or prevents defective plating as well as deviations of the multilayer ceramic electronic component, when at least any one of a first set of the first organic layer and the second organic layer, and a second set of the third organic layer and the fourth organic layer includes multifunctional alkoxysilane $Si-(C_nH_{2n+1})_3$.

A method for manufacturing a multilayer ceramic electronic component according to a preferred embodiment of the present invention includes the steps of preparing the laminated body, forming the first base electrode layer of the first external electrode and the second base electrode layer of the second external electrode by applying a conductive paste to the laminated body and baking the conductive paste, forming the organic layers by applying an organic process liquid to the surface of the first base electrode layer of the first external electrode, the surface of the second base electrode layer of the second external electrode, and the surface of the laminated body, or immersing the surfaces in the organic process liquid, and forming the first plating layer of the first external electrode and the second plating layer of the second external electrode by plating on the organic layers, the step of forming the organic layers is performed by applying the organic process liquid in two batches, with the first organic process liquid being different from the second organic process liquid, and thus is able to easily manufacture a multilayer ceramic electronic component which is able to significantly reduce or prevent cracking, deformation, or the like in the ceramic portion and the internal electrode portion of the laminated body, thus significantly improving the performance and the reliability.

According to the preferred embodiments of the present invention, cracking, deformation, or the like in the ceramic portion and the internal electrode portion of the laminated body are able to be significantly reduced or prevented, thus significantly improving the performance and reliability of the multilayer ceramic electronic component.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components according to preferred embodiments of the present invention will be described in detail below with reference to the drawings. It is to be noted that multilayer ceramic capacitors will be described as examples of the multilayer ceramic electronic components in the following preferred embodiments. Further, like or corresponding elements and features are denoted by like symbols in the figures, but the descriptions of the elements and features will not be repeated.

First Preferred Embodiment

Figure 1:
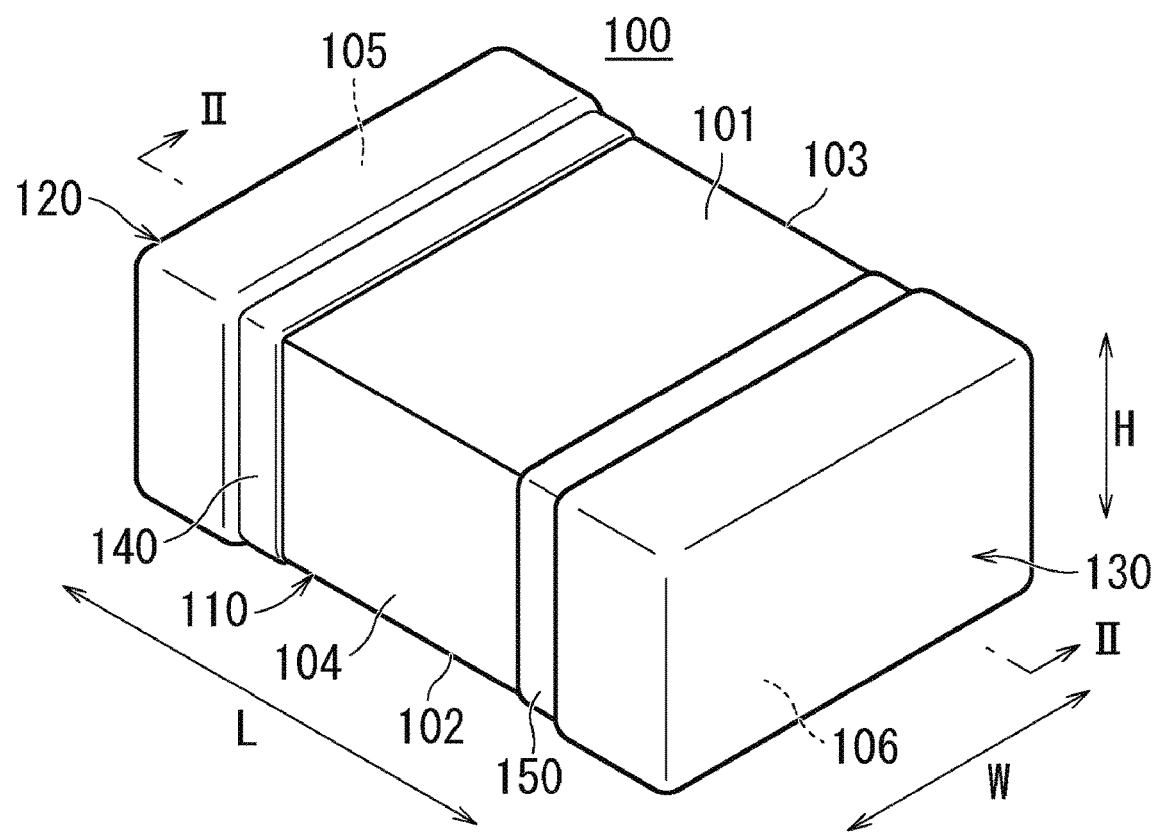
FIG. 1 is a perspective view showing a multilayer ceramic electronic component according to a first preferred embodiment of the present invention.
Figure 2:
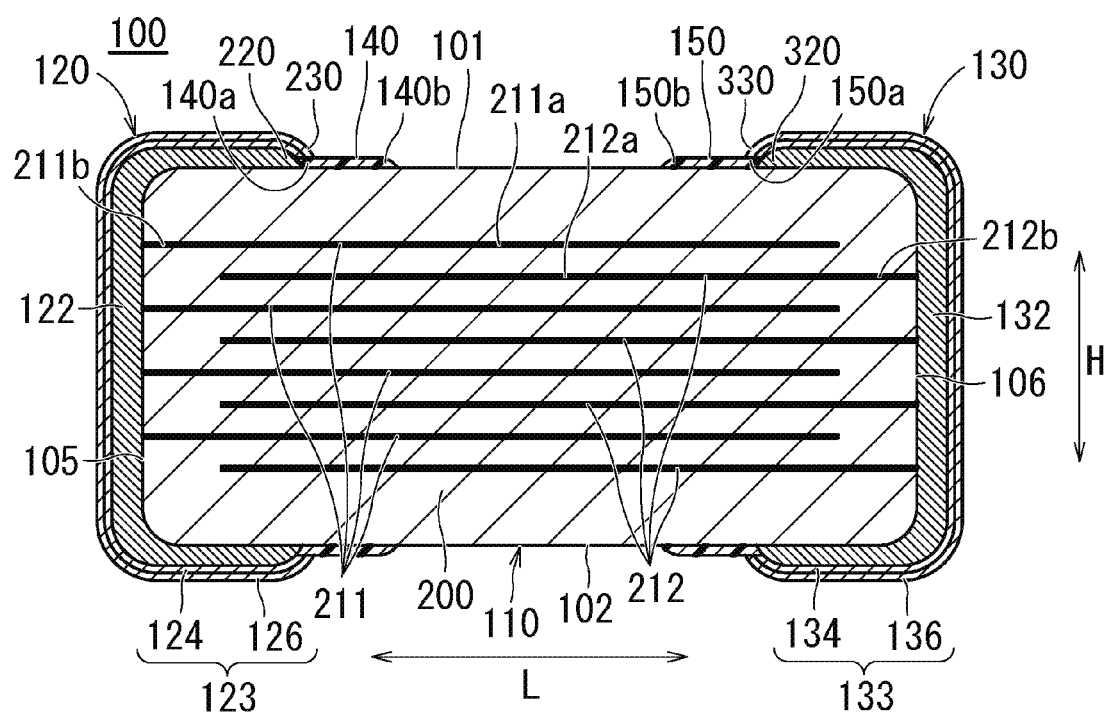
FIG. 2 is a cross-sectional view of the multilayer ceramic electronic component according to the first preferred embodiment of the present invention, as viewed from the direction of an arrow along line II-II in FIG. 1.

FIG. 1 is a perspective view showing a multilayer ceramic capacitor 100 according to a first preferred embodiment of the present invention. FIG. 2 is a cross-sectional view of the multilayer ceramic capacitor 100 according to the first preferred embodiment, as viewed from the direction of an arrow along line II-II in FIG. 1.

The multilayer ceramic capacitor 100 according to the first preferred embodiment of the present invention includes a cuboid or substantially cuboid shape, where the dimension in a length direction L is larger than the dimension in a width direction W. The cuboid or substantially cuboid shape encompasses the multilayer ceramic capacitor 100 which includes corners and ridges that are rounded, and the multilayer ceramic capacitor 100 which includes surfaces provided with a difference in level or unevenness.

The multilayer ceramic capacitor 100 includes a laminated body 110, a first external electrode 120, a second external electrode 130, a first organic layer 140, and a second organic layer 150.

The laminated body 110 includes a first principal surface 101 and a second principal surface 102 opposite in the laminating direction H of a plurality of dielectric layers, a first side surface 103 and a second side surface 104 opposite in the width direction W perpendicular or substantially perpendicular to the laminating direction H, and a first end surface 105 and a second end surface 106 opposite in the length direction L perpendicular or substantially perpendicular to both the laminating direction H and the width direction W.

The direction of stacking the dielectric layers of the laminated body 110 is defined as the laminating direction H, the direction of connecting the first external electrode 120 and the second external electrode 130 of the multilayer ceramic capacitor 100, among directions perpendicular or substantially perpendicular to the laminating direction H, is defined as the length direction L of the laminated body 110, and the direction perpendicular or substantially perpendicular to both the laminating direction H and the length direction L is defined as the width direction W of the laminated body 110, and these terms will be referred to in the following description.

The laminated body 110 includes the plurality of dielectric layers 200 and a plurality of internal electrodes that are laminated alternately. The laminated body 110 includes a cuboid or substantially cuboid shape. The laminating direction H of the plurality of dielectric layers 200 and the plurality of internal electrodes corresponds with the height direction.

The laminated body 110 includes a plurality of first internal electrodes 211 and a plurality of second internal electrodes 212 that are arranged alternately in different layers.

The first internal electrodes 211 each includes, as viewed from the laminating direction H, a rectangular or substantially rectangular first opposite portion 211a, and a first extended portion 211b extended from the first opposite portion 211a to the first end surface 105 of the laminated body 110. The first extended portion 211b includes an end surface exposed at the first end surface 105.

The second internal electrodes 212 each includes, as viewed from the laminating direction H, a rectangular or substantially rectangular second opposite portion 212a, and a second extended portion 212b extended from the second opposite portion 212a to the second end surface 106 of the laminated body 110. The second extended portion 212b includes an end surface exposed at the second end surface 106.

As shown in FIG. 2, the first opposite portions 211a of the first internal electrodes 211 and the second opposite portions 212a of the second internal electrodes 212 generate an electrostatic capacitance with the dielectric layers 200 interposed therebetween.

The dielectric layers 200 include, for example, a dielectric ceramic material including, as its main component, $BaTiO_3$, $CaTiO_3$, $SrTiO_3$, $CaZrO_3$, $PbTiO_3$, $Pb(Zr,Ti)O_3$, or the like. In addition, the dielectric layers 200 may include, as accessory components, an Mn compound, an Fe compound, a Cr compound, a Co compound, an Ni compound, or the like, for example. The dielectric layers 200 are preferably about 0.5 μm or more and about 10 μm or less in thickness, for example.

The first internal electrodes 211 and the second internal electrodes 212 may include, for example, appropriate conductive materials such as metals, e.g., Ni, Cu, Ag, Pd, or Au, alloys (e.g., Ag—Pd alloys) including at least one of the metals. The first internal electrodes 211 and the second internal electrodes 212 are each preferably about 0.2 μm or more and about 2.0 μm or less in thickness, for example.

The first external electrode 120 is located on the first end surface 105 of the laminated body 110, with ends extending on the first principal surface 101 and the second principal surface 102 as well as the first side surface 103 and the second side surface 104. The first external electrode 120 is electrically connected to the first internal electrodes 211.

The second external electrode 130 is located on the second end surface 106 of the laminated body 110, with ends extending on the first principal surface 101 and the second principal surface 102 as well as the first side surface 103 and the second side surface 104. The second external electrode 130 is electrically connected to the second internal electrodes 212. The first external electrode 120 and the second external electrode 130 are spaced from each other in the length direction L of the laminated body 110.

The first external electrode 120 includes a first base electrode layer 122 including a conductive metal and a glass component, and a first plating layer 123 located on the first base electrode layer 122. The second external electrode 130 includes a second base electrode layer 132 including a conductive metal and a glass component, and a second plating layer 133 located on the second base electrode layer 132.

The first base electrode layer 122 is located on the first end surface 105 of the laminated body 110, and includes ends that extend on the first principal surface 101 and the second principal surface 102 as well as the first side surface 103 and the second side surface 104.

The second base electrode layer 132 is located on the second end surface 106 of the laminated body 110, and includes ends that extend on the first principal surface 101 and the second principal surface 102 as well as the first side surface 103 and the second side surface 104.

The first base electrode layer 122 and the second base electrode layer 132 are formed by, for example, applying a conductive paste including a conductive metal and a glass component, and baking the paste. For example, Cu, Ni, Ag, Pd, an Ag—Pd alloy, Au, or the like is included as the conductive metal for the first base electrode layer 122 and the second base electrode layer 132. For example, glass including B, Si, Ba, Mg, Al, Li, or the like is included as the glass component for the first base electrode layer 122 and the second base electrode layer 132.

The first base electrode layer 122 and the second base electrode layer 132 are provided by co-firing with the internal electrodes, or provided by applying a conductive paste to the surface of the fired laminated body 110, and baking the paste. The first base electrode layer 122 and the second base electrode layer 132 are each preferably about 10 μm or more and about 50 μm or less in the thickness of the thickest portion, for example.

The first plating layer 123 located on the first base electrode layer 122 includes an end 230 in contact with the surface of the first organic layer 140. More specifically, the end 230 of the first plating layer 123 includes a leading end in contact with the surface of the first organic layer 140 located on the first principal surface 101 and the second principal surface 102 of the laminated body 110, and on the first side surface 103 and the second side surface 104 thereof.

The second plating layer 133 located on the second base electrode layer 132 includes an end 330 in contact with the surface of the second organic layer 150. More specifically, the end 330 of the second plating layer 133 includes a leading end in contact with the surface of the second organic layer 150 located on the first principal surface 101 and the second principal surface 102 of the laminated body 110, and on the first side surface 103 and the second side surface 104 thereof.

The first plating layer 123 and the second plating layer 133 include, for example, at least one selected from Cu, Ni, Ag, Pd, Ag—Pd alloy, Au, Sn, and the like.

The first plating layer 123 may include multiple layers, for example, and preferably includes a two-layer structure of a Ni plating layer 124 and a Sn plating layer 126. The second plating layer 133 may include multiple layers, for example, and preferably includes a two-layer structure of a Ni plating layer 134 and a Sn plating layer 136. The plating layer is preferably about 1 μm or more and about 15 μm or less in thickness per layer, for example.

The Ni plating layer 124 of the first plating layer 123 of the first external electrode 120 covers almost all of the surface of the first base electrode layer 122 of the first external electrode 120, and the end surface of the Ni plating layer 124 at the end 230 of the first plating layer 123 covers the surface of one end 140a of the first organic layer 140 which makes a contact to cover an end 220 of the first base electrode layer 122, and thus erosion of the first base electrode layer 122 and one end 140a of the first organic layer 140 by a solder in mounting the multilayer ceramic capacitor 100 is able to be significantly reduced or prevented.

The Ni plating layer 134 of the second plating layer 133 of the second external electrode 130 covers almost all of the surface of the second base electrode layer 132 of the second external electrode 130, and the end surface of the Ni plating layer 134 at the end 330 of the second plating layer 133 covers the surface of one end 150a of the second organic layer 150 which makes a contact to cover an end 320 of the second base electrode layer 132, and thus erosion of the second base electrode layer 132 and one end 150a of the second organic layer 150 by a solder in mounting the multilayer ceramic capacitor 100 is able to be significantly reduced or prevented.

In addition, the Sn plating layer 126 is further included on the Ni plating layer 124 for the first external electrode 120, thus significantly improving the solderability of the first external electrode 120. The Sn plating layer 136 is further included on the Ni plating layer 134 for the second external electrode 130, thus significantly improving the solderability of the second external electrode 130. As a result, the multilayer ceramic capacitor 100 is able to be easily mounted.

The first organic layer 140 is located closer to the first end surface 105 of the laminated body 110, and located on the first principal surface 101, the second principal surface 102, the first side surface 103, and the second side surface 104 to wrap around the surface of the laminated body 110. One end 140a of the first organic layer 140 makes a contact to cover the end 220 of the first base electrode layer 122 of the first external electrode 120. The first organic layer 140 extends from the end 220 of the first base electrode layer 122 even to at least a portion of the surface of the laminated body 110, and the other end 140b is located closer to the second end surface 106 than the end 230 of the first plating layer 123 and exposed. Furthermore, the end 230 of the first plating layer 123 of the first external electrode 120 makes contact with the surface of one end 140a of the first organic layer 140, without covering the end 220 of the first base electrode layer 122.

The second organic layer 150 is located closer to the second end surface 106 of the laminated body 110, and located on the first principal surface 101, the second principal surface 102, the first side surface 103, and the second side surface 104 to wrap around the surface of the laminated body 110. One end 150a of the second organic layer 150 makes a contact to cover the end 320 of the second base electrode layer 132 of the second external electrode 130. The second organic layer 150 extends from the end 320 of the second base electrode layer 132 even to at least a portion of the surface of the laminated body 110, and the other end 150b is located closer to the first end surface 105 than the end 330 of the second plating layer 133 and exposed. Furthermore, the end 330 of the second plating layer 133 of the second external electrode 130 makes contact with the surface of one end 150a of the second organic layer 150, without covering the end 320 of the second base electrode layer 132.

In accordance with the foregoing features, if a substrate is warped by a thermal shock or the like with the multilayer ceramic capacitor 100 mounted on the substrate, a stress based on the warp is able to cause delamination between the first base electrode layer 122 and the first plating layer 123 of the first external electrode 120 and delamination between the second base electrode layer 132 and the second plating layer 133 of the second external electrode 130. Therefore, the stress is dispersed, thus making it possible to significantly reduce or prevent cracking, deformation, or the like in the ceramic portion and the internal electrode portion of the multilayer ceramic capacitor 100. As a result, the reliability of the multilayer ceramic capacitor 100 is able to be significantly improved. The crack is defined as cracking which develops from the outer layer portion toward the internal electrode layer portion with an external electrode end as a starting point.

Figure 3:
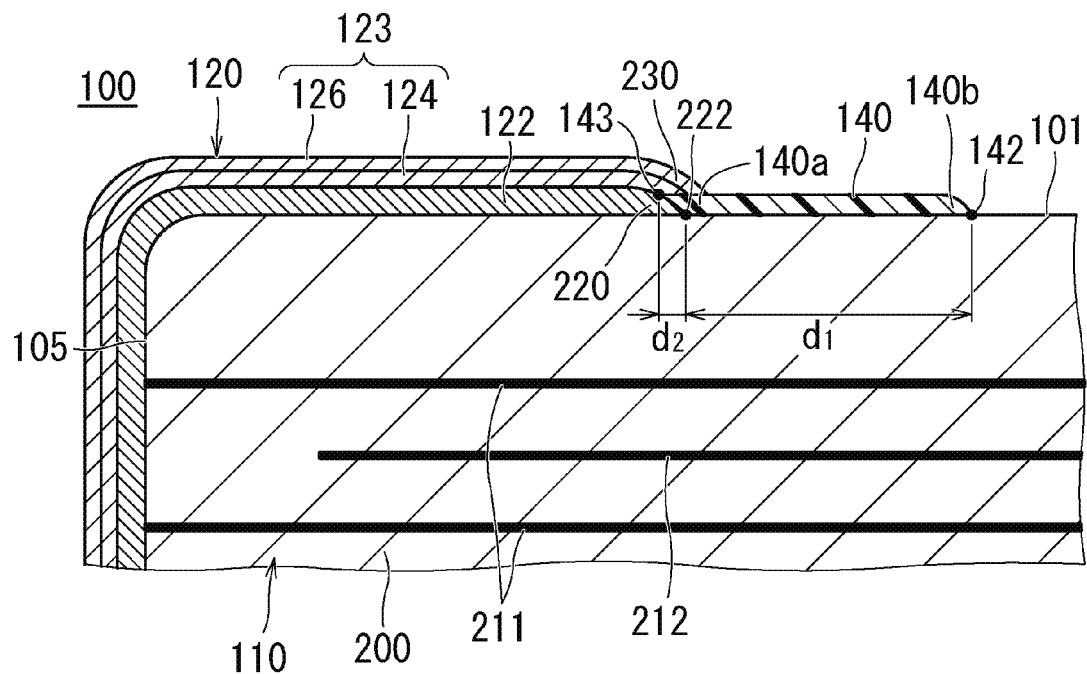
FIG. 3 is a partially enlarged cross-sectional view of the multilayer ceramic electronic component according to the first preferred embodiment of the present invention.

As shown in FIG. 3, when the first organic layer 140 contacts and covers the end 220 of the first base electrode layer 122 of the first external electrode 120, a portion of the first organic layer 140 in contact with the laminated body 110 includes a dimension $d_1$ (that is, a dimension in the length direction L from a leading end 222 of the first base electrode layer 122 to a leading end 142 of the first organic layer 140 closer to the second end surface 106) of about 5 μm or more and about 100 μm or less in the length direction L, for example. It is to be noted that when the second organic layer 150 contacts and covers the end 320 of the base electrode layer 132 of the second external electrode 130, the second organic layer 150 preferably includes the same or similar dimensions as the dimensions of the first organic layer 140 described above, for example.

Furthermore, as shown in FIG. 3, a portion of the first organic layer 140 in contact with the first base electrode layer 122 includes a dimension $d_2$ (that is, a dimension in the length direction L from the leading end 222 of the first base electrode layer 122 to a leading end 143 of the first organic layer 140 closer to the first end surface 105) of about 5 μm or more and about 100 μm or less in the length direction L, for example. A portion of the second organic layer 150 in contact with the second base electrode layer 132 also includes a dimension $d_2$ (that is, a dimension in the length direction L from a leading end of the second base electrode layer 132 to a leading end of the second organic layer 150 closer to the second end surface 106) of about 5 μm or more and about 100 μm or less in the length direction L, for example. Thus, cracking of the laminated body 110 is able to be significantly reduced or prevented, and also deviations of the multilayer ceramic capacitor 100 are able to be significantly reduced or prevented. The deviation of the multilayer ceramic capacitor is defined as a failure in a tombstone shape, or a failure to achieve conduction on a solder-mounted substrate due to deviation from the substrate.

The first organic layer 140 and the second organic layer 150 are preferably about 5 nm or more and about 500 nm or less in thickness, for example. Thus, cracking in the laminated body 110 is able to be significantly reduced or prevented, and also defective plating as well as deviations of the multilayer ceramic capacitor 100 are able to be significantly reduced or prevented.

The first organic layer 140 and the second organic layer 150 include an organic silicon compound. For example, decyltrimethoxysilane, n-propyltrimethoxysilane, octyltriethoxysilane, or the like is included as the organic silicon compound. In particular, when an organic silicon compound that includes a structure of multifunctional alkoxysilane Si—$(C_nH_{2n+1})_3$ and contains an N element is included as the first organic layer 140 and the second organic layer 150, the layers are able to be reliably formed on the surfaces of the laminated body 110, the first base electrode layer 122 of the first external electrode 120, and the like, thus significantly improving the overall reliability of the multilayer ceramic capacitor 100.

In addition, there is a portion without any organic layer between the first external electrode 120 and the second external electrode 130 of the multilayer ceramic capacitor 100. Thus, because the surface of the laminated body 110 is exposed, the fixing strength with a conductive adhesive for use in mounting is significantly improved, thus making it possible to significantly reduce or prevent a decrease in the mounting reliability.

In addition, an adhesion strength between the first base electrode layer 122 of the first external electrode 120 and the laminated body 110 is preferably higher than an adhesion strength between the first organic layer 140 and the first plating layer 123 of the first external electrode 120, for example. An adhesion strength between the second base electrode layer 132 of the second external electrode 130 and the laminated body 110 is preferably higher than an adhesion strength between the second organic layer 150 and the second plating layer 133 of the second external electrode 130, for example. Thus, delamination is able to be achieved, respectively, between the first organic layer 140 and the second organic layer 150, and between the first plating layer 123 and the second plating layer 133, and the adhesion is able to be maintained between the laminated body 110 and the first organic layer 140, and between the laminated boy 110 and the second organic layer 150, and ingress of water and the like is able to be thus significantly reduced or prevented. Therefore, defects are able to be further significantly reduced or prevented, and the reliability of the multilayer ceramic capacitor 100 is able to be significantly improved.

In addition, the adhesion strength between the laminated body 110 and the first organic layer 140 is preferably higher than the adhesion strength between the first organic layer 140 and the first plating layer 123, for example. Furthermore, the adhesion strength between the laminated body 110 and the second organic layer 150 is preferably higher than the adhesion strength between the second organic layer 150 and the second plating layer 133, for example.

Thus, if a substrate is warped by a thermal shock or the like with the multilayer ceramic capacitor 100 mounted on the substrate, a stress based on the warp is able to cause delamination between the first base electrode layer 122 and the first plating layer 123 of the first external electrode 120 and delamination between the second base electrode layer 132 and the second plating layer 133 of the second external electrode 130. Therefore, the stress is further dispersed, thus making it possible to significantly reduce or prevent cracking, deformation, or the like in the ceramic portion and the internal electrode portion of the multilayer ceramic capacitor 100. As a result, the reliability of the multilayer ceramic capacitor 100 is able to be further significantly improved.

The end 230 of the first plating layer 123 of the first external electrode 120 contacts the surface of the first organic layer 140, and the end 330 of the second plating layer 133 of the second external electrode 130 contacts the surface of the second organic layer 150. Thus, if a substrate is warped by a thermal shock or the like with the multilayer ceramic capacitor 100 according to the first preferred embodiment mounted on the substrate, a stress based on the warp is able to cause delamination between the first base electrode layer 122 and the first plating layer 123 of the first external electrode 120 and delamination between the second base electrode layer 132 and the second plating layer 133 of the second external electrode 130. Therefore, the stress is dispersed, thus making it possible to significantly reduce or prevent cracking, deformation, or the like in the ceramic portion and the internal electrode portion of the multilayer ceramic capacitor 100. As a result, the reliability of the multilayer ceramic capacitor 100 is able to be significantly improved. The crack is defined as cracking which develops from the outer layer portion toward the internal electrode layer portion with an external electrode end as a starting point.

In the multilayer ceramic capacitor 100 according to the first preferred embodiment, a portion of the first organic layer 140 in contact with the first base electrode layer 122 includes a dimension $d_2$ (that is, a dimension in the length direction L from the leading end 222 of the first base electrode layer 122 to a leading end 143 of the first organic layer 140 closer to the first end surface 105) of about 5 μm or more and about 100 μm or less in the length direction L. A portion of the second organic layer 150 in contact with the second base electrode layer 132 includes a dimension $d_2$ (that is, a dimension in the length direction L from a leading end of the second base electrode layer 132 to a leading end of the second organic layer 150 closer to the second end surface 106) of about 5 μm or more and about 100 μm or less in the length direction L. Thus, cracking of the laminated body 110 is able to be significantly reduced or prevented, and also deviations of the multilayer ceramic capacitor 100 are able to be significantly reduced or prevented. The deviation of the multilayer ceramic capacitor is defined as a failure in a tombstone shape, or a failure to achieve conduction on a solder-mounted substrate due to deviation from the substrate.

Furthermore, in the multilayer ceramic capacitor 100 according to the first preferred embodiment, the first organic layer 140 extends from the end 220 of the first base electrode layer 122 to at least a portion of the surface of the laminated body 110, and the second organic layer 150 extends from the end 320 of the second base electrode layer 132 to at least a portion of the surface of the laminated body 110, thus making it possible to reliably achieve delamination between the base electrode layers and the plating layers without decreasing solderability.

Figure 4:
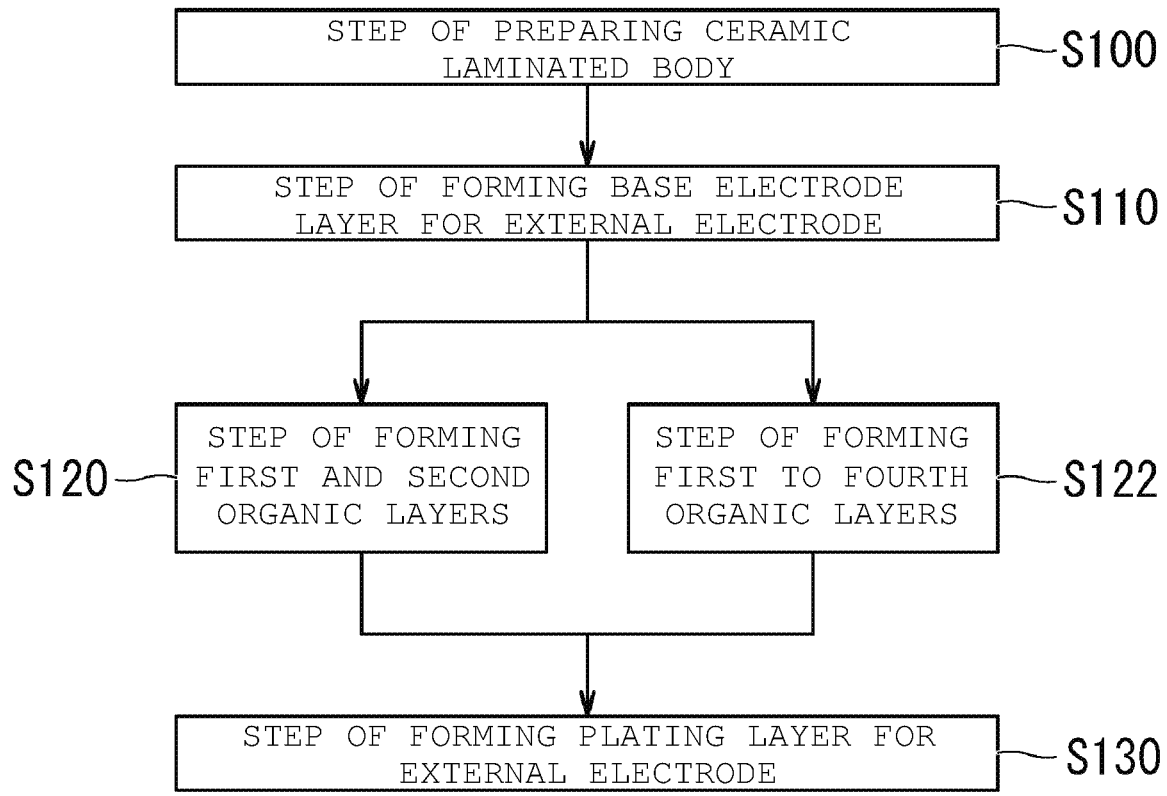
FIG. 4 is a flowchart showing a method for manufacturing a multilayer ceramic electronic component according to a preferred embodiment of the present invention.

Next, a method for manufacturing the multilayer ceramic capacitor 100 according to the first preferred embodiment of the present invention will be described. FIG. 4 is a flowchart showing a method for manufacturing a multilayer ceramic capacitor according to a preferred embodiment of the present invention.

As shown in FIG. 4, first, the laminated body 110 is prepared, which includes the first internal electrodes 211 and the second internal electrodes 212 (S100). Specifically, a ceramic paste including a ceramic powder is applied as a sheet, for example, by a screen printing method, and dried, thus preparing mother ceramic green sheets.

Next, onto the mother ceramic green sheets, a conductive paste for internal electrodes is applied in a predetermined pattern, for example, by screen printing or the like, thus defining conductive patterns of internal electrodes as the first internal electrodes 211. Onto others of the mother ceramic green sheets, a conductive paste for internal electrodes is applied in a predetermined pattern, for example, by screen printing or the like, thus defining conductive patterns of internal electrodes as the second internal electrodes 212.

In this way, prepared are the mother ceramic green sheets with the conductive patterns of internal electrodes as the first internal electrodes 211, the mother ceramic green sheets with the conductive patterns of internal electrodes as the second internal electrodes 212, and the mother ceramic green sheets without any conductive pattern of internal electrodes. It is to be noted that the ceramic paste and the conductive paste for the internal electrodes may include, for example, known binders and solvents.

Next, a mother stacked body is prepared. The mother stacked body is prepared as described below. The mother ceramic green sheets for outer layers without any conductive pattern printing for the internal electrodes are stacked to reach a predetermined number of sheets, and the mother ceramic green sheets with the conductive pattern printing for the internal electrodes as the first internal electrodes 211 and the mother ceramic green sheets with the conductive pattern printing for the internal electrodes as the second internal electrodes 212 are sequentially and alternately stacked thereon. The mother ceramic green sheets for outer layers without any conductive pattern printing for the internal electrodes are further stacked thereon to reach a predetermined number of sheets, thus preparing the mother stacked body. The mother stacked body may be, if desired, subjected to pressing in the stacking direction by, for example, isostatic pressing.

Next, the mother stacked body is cut in predetermined positions, thus cutting out a plurality of raw laminated bodies 110 of a predetermined size. The raw laminated bodies 110 may include corners and ridges rounded by barrel polishing or the like.

Next, the raw laminated bodies 110 are subjected to firing, thus providing laminated bodies 110 provided therein with first internal electrodes 211 and second internal electrodes 212, where the first internal electrodes 211 include first extended portions 211b exposed at first end surfaces 105, and the second internal electrodes 212 include second extended portions 212b exposed at second end surfaces 106. The firing temperature is set appropriately depending on the types of the ceramic material and the conductive material, and for example, set within the range of about 900° C. or higher and about 1300° C. or lower.

Next, base electrode layers for external electrodes are defined on both ends of the fired laminated body 110 (S110). A conductive paste for external electrodes is applied to the both ends of the fired laminated body 110, and subjected to baking, thus defining the first base electrode layer 122 for the first external electrode 120 and the second base electrode layer 132 for the second external electrode 130. The baking temperature is preferably about 700° C. or higher and about 900° C. or lower, for example.

Next, the first organic layer 140 and the second organic layer 150 are formed (S120). The first organic layer 140 and the second organic layer 150 are prepared as described below.

The laminated bodies 110 with the baked first base electrode layers 122 and second base electrode layers 132 respectively for the first external electrodes 120 and the second external electrodes 130 are arranged in the longitudinal direction, and an organic process liquid is applied by a screen printing method to only predetermined portions of the first principal surfaces 101, second principal surfaces 102, first side surfaces 103, and second side surfaces 104, which are closer to the first external electrodes 120 of the laminated bodies 110 to cover the ends 220 of the first base electrode layers 122, and the organic process liquid is applied by a screen printing method to only predetermined portions of the first principal surfaces 101, second principal surfaces 102, first side surfaces 103, and second side surfaces 104, which are closer to the second external electrodes 130 of the laminated bodies 110 to cover the ends 320 of the first base electrode layers 132. Thereafter, the organic process liquid is dried at a temperature of about 100 to about 200° C., thus providing the first organic layer 140 and the second organic layer 150.

After applying the first organic process liquid to only the predetermined portions, the laminated body 110 is taken out, and then dried at a temperature of about 100° C. or higher and about 200° C. or lower. The first organic process liquid is provided by diluting the organic process liquid with an alcohol solvent to about 3 weight % or less. Next, after applying the second organic process liquid to only the predetermined portions, the laminated body 110 is taken out, and then dried at a temperature of about 100° C. or higher and about 200° C. or lower. The second organic process liquid is provided by diluting the organic process liquid with an alcohol solvent to about 3 weight % or more and about 10% or less.

Next, plating layers for external electrodes are formed on both ends of the laminated body 110 (S130). The first plating layer 123 for the first external electrode 120 covers almost all of the surface of the first base electrode layer 122 for the first external electrode 120, and the end surface of the end 230 of the first plating layer 123 covers the surface of one end 140a of the first organic layer 140. The second plating layer 133 for the second external electrode 130 covers almost all of the surface of the second base electrode layer 132 for the second external electrode 130, and the end surface of the end 330 of the second plating layer 133 covers the surface of one end 150a of the second organic layer 150.

Next, the first organic layer 140 and the second organic layer 150 may be partially removed, if desired.

The foregoing method is able to easily manufacture the multilayer ceramic capacitor 100 which is able to significantly reduce or prevent cracking, deformation, or the like in the ceramic portion and the internal electrode portion of the laminated body 110, thus significantly improving the performance and the reliability of the multilayer ceramic capacitor 100.

Second Preferred Embodiment

A multilayer ceramic capacitor according to a second preferred embodiment of the present invention will be described with reference to the drawings. The multilayer ceramic capacitor according to the second preferred embodiment of the present invention includes organic layers provided between the base electrode layers and plating layers of the external electrodes in the multilayer ceramic capacitor 100 according to the first preferred embodiment of the present invention, and the same or similar configurations as the multilayer ceramic capacitor 100 according to the first preferred embodiment of the present invention will not described repeatedly.

Figure 5:
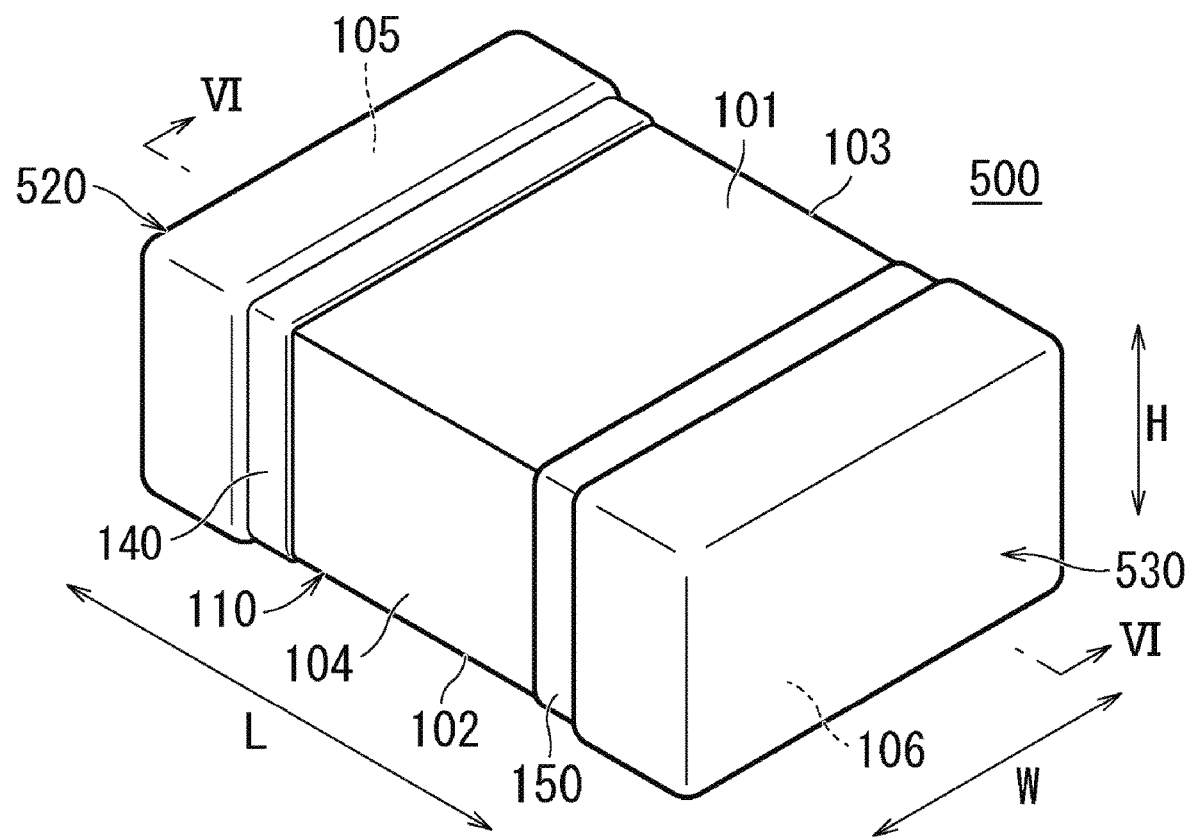
FIG. 5 is a perspective view showing a multilayer ceramic electronic component according to a second preferred embodiment of the present invention.
Figure 6:
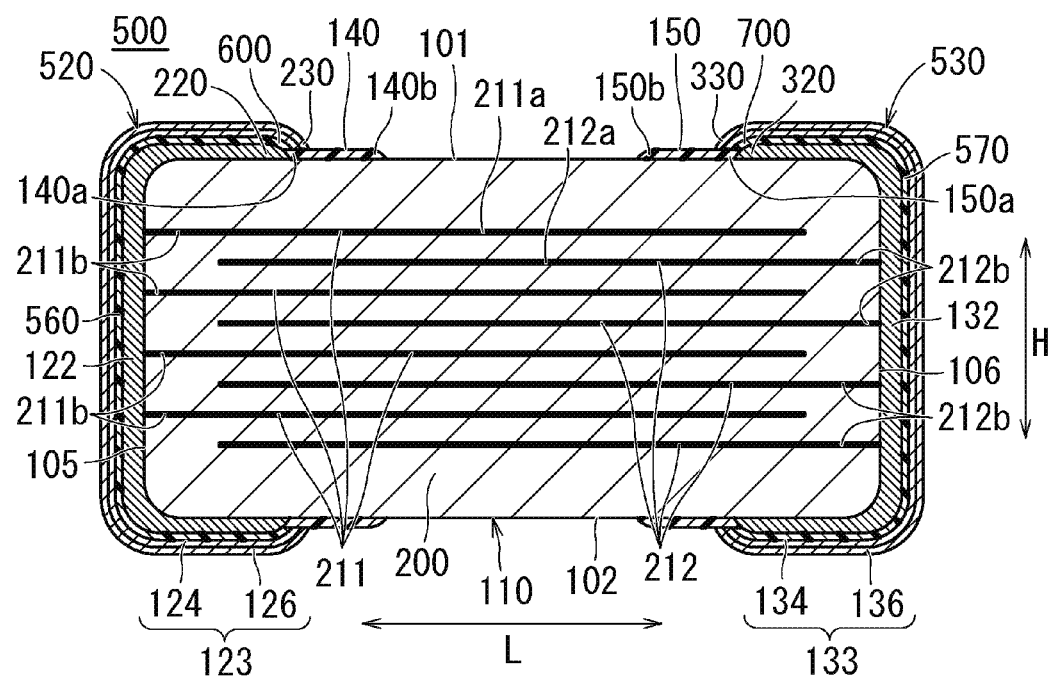
FIG. 6 is a cross-sectional view of the multilayer ceramic electronic component according to the second preferred embodiment of the present invention, as viewed from the direction of an arrow along line VI-VI in FIG. 5.
Figure 7:
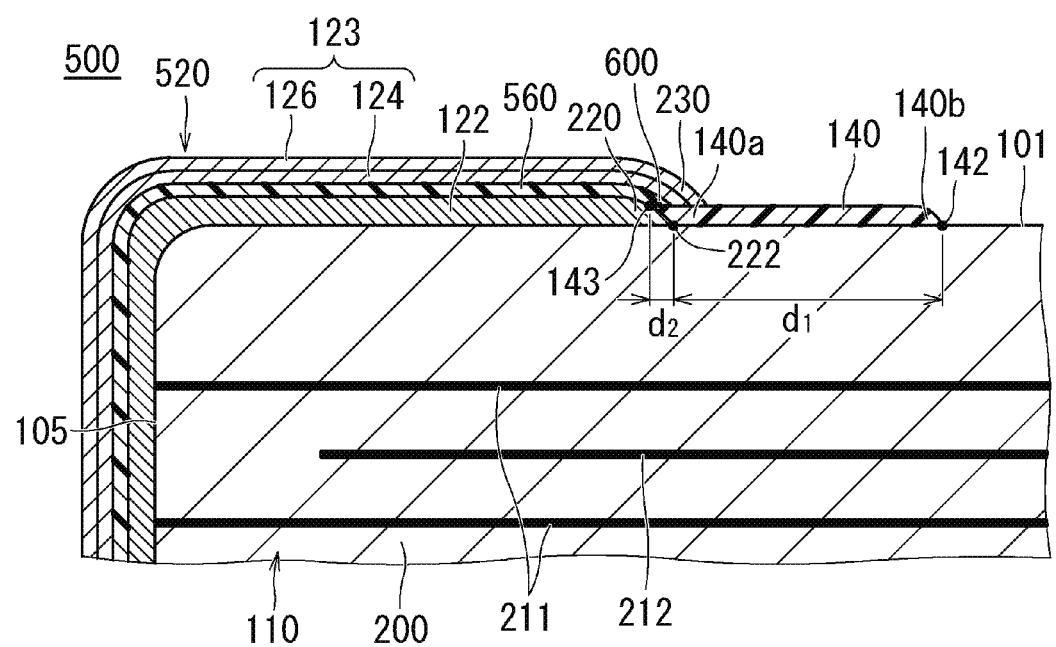
FIG. 7 is a partially enlarged cross-sectional view of the multilayer ceramic electronic component according to the second preferred embodiment of the present invention.

FIG. 5 is a perspective view showing a multilayer ceramic electronic component 500 according to the second preferred embodiment of the present invention. FIG. 6 is a cross-sectional view of the multilayer ceramic electronic component 500 according to the second preferred embodiment, as viewed from the direction of an arrow along line VI-VI in FIG. 5. FIG. 7 is a partially enlarged cross-sectional view of the multilayer ceramic electronic component 500 according to the second preferred embodiment.

The multilayer ceramic capacitor 500 includes a laminated body 110, a first external electrode 520, a second external electrode 530, a first organic layer 140, a second organic layer 150, a third organic layer 560, and a fourth organic layer 570.

The laminated body 110 includes a plurality of dielectric layers 200, and a plurality of first internal electrodes 211 and a plurality of second internal electrodes 212 that are arranged alternately in different layers.

The first external electrode 520 is located on an end surface 105 of the laminated body 110, with ends extending on a first principal surface 101 and a second principal surface 102 as well as a first side surface 103 and a second side surface 104. The first external electrode 520 is electrically connected to the first internal electrodes 211.

The second external electrode 530 is located on a second end surface 106 of the laminated body 110, with ends extending on the first principal surface 101 and the second principal surface 102 as well as the first side surface 103 and the second side surface 104. The second external electrode 530 is electrically connected to the second internal electrodes 212. The first external electrode 520 and the second external electrode 530 are spaced from each other in the length direction L of the laminated body 110.

The first external electrode 520 includes a first base electrode layer 122 including a conductive metal and a glass component, and a first plating layer 123. The second external electrode 530 includes a second base electrode layer 132 including a conductive metal and a glass component, and a second plating layer 133.

The third organic layer 560 is located between the first base electrode layer 122 and the first plating layer 123 of the first external electrode 520. The fourth organic layer 570 is located between the second base electrode layer 132 and the second plating layer 133 of the second external electrode 530.

The first base electrode layer 122 is located on the first end surface 105 of the laminated body 110, and includes ends that extend on the first principal surface 101 and the second principal surface 102 as well as the first side surface 103 and the second side surface 104.

The second base electrode layer 132 is located on the second end surface 106 of the laminated body 110, and includes ends that extend on the first principal surface 101 and the second principal surface 102 as well as the first side surface 103 and the second side surface 104.

The third organic layer 560 covers the first base electrode layer 122 of the first external electrode 520, and the third organic layer 560 includes an end 600 in contact with the surface of the first organic layer 140. More specifically, the end 600 of the third organic layer 560 makes contact with one end 140a of the first organic layer 140 located on the first principal surface 101, the second principal surface 102, the first side surface 103, and the second side surface 104 of the laminated body 110, without covering an end 220 of the first base electrode layer 122.

The fourth organic layer 570 covers the second base electrode layer 132 of the second external electrode 530, and the fourth organic layer 570 includes an end 700 in contact with the surface of the second organic layer 150. More specifically, the end 700 of the fourth organic layer 570 makes contact with one end 150a of the second organic layer 150 located on the first principal surface 101, the second principal surface 102, the first side surface 103, and the second side surface 104 of the laminated body 110, without covering an end 320 of the second base electrode layer 132.

The first plating layer 123 located on the third organic layer 560 preferably includes an end 230 in contact with the surface of the first organic layer 140. More specifically, the end 230 of the first plating layer 123 preferably includes a leading end in contact with the surface of one end 140a of the first organic layer 140, for example.

The second plating layer 133 located on the fourth organic layer 570 preferably includes an end 330 in contact with the surface of the second organic layer 150. More specifically, the end 330 of the second plating layer 133 preferably includes a leading end in contact with the surface of one end 150a of the second organic layer 150, for example.

In addition, the first organic layer 140 is located closer to the first end surface 105 of the laminated body 110, and located on the first principal surface 101, the second principal surface 102, the first side surface 103, and the second side surface 104 to wrap around the surface of the laminated body 110. One end 140a of the first organic layer 140 makes a contact to cover the end 220 of the first base electrode layer 122 of the first external electrode 120. The first organic layer 140 extends from the end 220 of the first base electrode layer 122 even to at least a portion of the surface of the laminated body 110, and the other end 140b is located closer to the second end surface 106 than the end 230 of the first plating layer 123 and exposed.

The second organic layer 150 is located closer to the second end surface 106 of the laminated body 110, and located on the first principal surface 101, the second principal surface 102, the first side surface 103, and the second side surface 104 to wrap around the surface of the laminated body 110. One end 150a of the second organic layer 150 makes a contact to cover the end 320 of the second base electrode layer 132 of the second external electrode 130. The second organic layer 150 extends from the end 320 of the second base electrode layer 132 even to at least a portion of the surface of the laminated body 110, and the other end 150b is located closer to the first end surface 105 than the end 330 of the second plating layer 133 and exposed.

In addition, the first organic layer 140 and the second organic layer 150 are preferably larger in thickness than the third organic layer 560 and the fourth organic layer 570, for example. More specifically, when the first organic layer 140 and the second organic layer 150 are about 5 nm or more and about 500 nm or less in thickness, the third organic layer 560 and the fourth organic layer 570 are preferably about 1 nm or more and about 10 nm or less in thickness, for example.

The third organic layer 560 and the fourth organic layer 570 include an organic silicon compound. For example, decyltrimethoxysilane, n-propyltrimethoxysilane, octyltriethoxysilane, or the like is included as the organic silicon compound. In particular, an organic silicon compound that includes a structure of multifunctional alkoxysilane Si—$(C_nH_{2n+1})_3$ is preferably included as a material for the third organic layer 560 and the fourth organic layer 570.

An atomic concentration ratio of Si to Cu is preferably about 1% or more and about 5% or less at the surface of the third organic layer 560 on the first end surface 105, the first side surface 103, and the second side surface 104 of the laminated body 110, as well as at the surface of the fourth organic layer 570 on the first end surface 105, the first side surface 103, and the second side surface 104 thereof, for example. Thus, cracking, deformation, or the like in the ceramic portion and the internal electrode portion of the multilayer ceramic capacitor 500 are able to be significantly reduced or prevented, and also defective plating as well as deviations of the multilayer ceramic capacitor 500 are able to be significantly reduced or prevented.

In addition, the relational expression of A>B is preferably satisfied when the atomic concentration ratio of Si to Cu is denoted by B in the third organic layer 560 located on the first base electrode layer 122 located on the first end surface 105, the atomic concentration ratio of Si to Cu is denoted by A in the third organic layer 560 located on the first base electrode layer 122 located on the first principal surface 101 and the second principal surface 102, and the atomic concentration ratio of Si to Cu is denoted by A in the first organic layer 140 located directly on the first principal surface 101 and the second principal surface 102. The relational expression of A>B is preferably satisfied when the atomic concentration ratio of Si to Cu is denoted by B in the fourth organic layer 570 located on the second base electrode layer 132 located on the second end surface 106, the atomic concentration ratio of Si to Cu is denoted by A in the fourth organic layer 570 located on the second base electrode layer 132 located on the first principal surface 101 and the second principal surface 102, and the atomic concentration ratio of Si to Cu is denoted by A in the second organic layer 150 located directly on the first principal surface 101 and the second principal surface 102. Thus, delamination of the first organic layer 140, the second organic layer 150, the third organic layer 560, and the fourth organic layer 570 is able to be stopped by the first side surface 103 and the second side surface 104, thus significantly reducing or preventing a decrease in reliability.

Further, the atomic concentration ratio of Si to Cu in the first organic layer 140 located on the first base electrode layer 122 located on the first side surface 103 and the second side surface 104 and the atomic concentration ratio of Si to Cu in the first organic layer 140 located directly on the first side surface 103 and the second side surface 104 preferably include the same or similar value as A, and preferably satisfy the relational expression of A>B.

The atomic concentration ratios mentioned above are measured by XPS (X-ray photoelectron spectroscopy). More specifically, the atomic concentration ratios of Si to Cu in the first organic layer 140 and the second organic layer 150 are able to be provided by applying an XPS (X-ray photoelectron spectroscopy) analysis directly to the surfaces of the layers, and calculating the atomic concentration ratios on the basis of the respective peak areas of Cu2p and Si2p and the sensitivity coefficient of the measurement system. Further, the atomic concentration ratios of Si to Cu in the third organic layer 560 and the fourth organic layer 570 are able to be provided by making a cut on the order of about 150 μm square at a central portion of the first principal surface 101, the second principal surface 102, the first side surface 103, the second side surface 104, or the first end surface 105 where the third organic layer 560 or the fourth organic layer 570 is present, peeling the first plating layer 123 or the second plating layer 133 at the cut portions, applying an XPS (X-ray photoelectron spectroscopy) analysis to the surfaces, and calculating the atomic concentration ratios on the basis of the respective peak areas of Cu2p and Si2p and the sensitivity coefficient of the measurement system. In addition, measurement conditions for the XPS are provided below.

System Name: VersaProbe from ULVAC-PHI
X-Ray: monochromatic Al-Kα Ray
X-Ray Diameter: about 100 μm in Half-Power Beamwidth
Takeoff Angle of Photoelectron: about 45°
Measured Spectra: Si2p, Cu2p
Compensation Method for Charging during Measurement: Irradiation with Electron Beams and Ion beams The multilayer ceramic capacitor 500 according to the second preferred embodiment includes the third organic layer 560 that covers the first base electrode layer 122 for the first external electrode 120, with the end 600 in contact with the surface of the first organic layer 140, and the fourth organic layer 570 that covers the second base electrode layer 132 for the second external electrode 130, with the end 700 in contact with the surface of the second organic layer 150, thus making the first base electrode layer 122 and the first plating layer 123 of the first external electrode 120 more likely to undergo delamination, and making the second base electrode layer 132 and the second plating layer 133 of the second external electrode 130 more likely to undergo delamination. Therefore, a stress based on warp generated at the substrate by thermal shocks or the like is further dispersed, thus making it possible to significantly reduce or prevent cracking, deformation, or the like in the ceramic portion and the internal electrode portion of the multilayer ceramic capacitor 500. As a result, the reliability of the multilayer ceramic capacitor 500 is able to be further significantly improved.

In addition, because the first organic layer 140 and the second organic layer 150 are larger in thickness than the third organic layer 560 and the fourth organic layer 570, the multilayer ceramic capacitor 500 according to the second preferred embodiment makes it easy to initiate delamination between the first base electrode layer 122 and the first plating layer 123 and delamination between the second base electrode layer 132 and the second plating layer 133, thus significantly reducing or preventing the occurrence of subsequent delamination. As a result, various common problems are able to be significantly reduced or prevented, such as, for example, a fall of the multilayer ceramic capacitor 500 from a substrate.

Furthermore, the multilayer ceramic electronic component 500 according to the second preferred embodiment not only significantly reduces or prevents cracking in the laminated body 110, but also significantly reduces or prevents defective plating as well as deviations of the multilayer ceramic capacitor 500, since the third organic layer 560 and the fourth organic layer 570 each include an organic silicon compound.

In addition, the multilayer ceramic electronic component 500 according to the second preferred embodiment not only further significantly reduces or prevents cracking in the laminated body 110, but also further significantly reduces or prevents defective plating as well as deviations of the multilayer ceramic capacitor 500, since an organic silicon compound that includes a structure of multifunctional alkoxysilane Si—$(C_nH_{2n+1})_3$ is included for at least any one of the first organic layer 140 and the second organic layer 150, and the third organic layer 560 and the fourth organic layer 570.

Next, a method for manufacturing the multilayer ceramic capacitor 500 according to the second preferred embodiment of the present invention will be described with reference to FIG. 4, which has been previously described with respect to the first preferred embodiment.

The method for manufacturing the multilayer ceramic capacitor 500 according to the second preferred embodiment includes a step S122 of forming the first organic layer 140, the second organic layer 150, the third organic layer 560, and the fourth organic layer 570, in place of the step S120 of forming the first organic layer 140 and the second organic layer 150 according to the first preferred embodiment. The other steps are the same as, or similar to, the steps of the method for manufacturing the multilayer ceramic capacitor 100 according to the first preferred embodiment, and the steps will be thus not described repeatedly. The first organic layer 140, the second organic layer 150, the third organic layer 560, and the fourth organic layer 570 are prepared as described below.

The first organic layer 140, the second organic layer 150, the third organic layer 560, and the fourth organic layer 570 are formed through the application of or immersion in an organic process liquid to cover predetermined surfaces of the first base electrode layer 122 for the first external electrode 120, of the second base electrode layer 132 for the second external electrode 130, and of the laminated body 110. In the step of forming the first organic layer 140, the second organic layer 150, the third organic layer 560, and the fourth organic layer 570, the organic process liquid is applied in two batches.

Specifically, the laminated bodies 110 with the baked first base electrode layers 122 and the second base electrode layers 132 respectively for the first external electrodes 120 and the second external electrodes 130 are arranged in the longitudinal direction, and the surfaces of the first external electrodes 120 and the second external electrodes 130 are immersed in the first organic process liquid to leave the ends 220 covered by the first organic layers 140 and the ends 320 covered by the second organic layers 150. Thereafter, the laminated body 110 is dried at a temperature of about 100° C. or higher and about 200° C. or lower, for example, thus forming the third organic layer 560 and the fourth organic layer 570 respectively on the surfaces of the first external electrode 120 and the second external electrode 130 to leave the end 220 covered by the first organic layer 140 and the end 320 covered by the second organic layer 150. The first organic process liquid includes a monofunctional silane coupling material, specifically with the use of decyltrimethoxysilane, n-propyltrimethoxysilane, octyltriethoxysilane, or the like, and provided by diluting the organic process liquid with an alcohol solvent to about 3 weight % or less.

Next, for the laminated body 110, predetermined surfaces of the first base electrode layer 122 for the first external electrode 120, of the second base electrode layer 132 for the second external electrode 130, and of the laminated body 110 are immersed in the second organic process liquid. The organic film formed by the second organic process liquid is less likely to be included on the organic film formed from the first organic process liquid, and thus included on the predetermined surfaces of the end 220 of the first base electrode layer 122, of the end 320 of the second base electrode layer 132, and of the laminated body 110. Thereafter, the laminated body 110 is dried at a temperature of about 100° C. or higher and about 200° C. or lower, for example, thus defining the first organic layer 140 and the second organic layer 150 to cover the end 220 of the first base electrode layer 122 and the end 320 of the second base electrode layer 132. The second organic process liquid is, with the inclusion of multifunctional alkoxysilane Si—$(C_nH_{2n+1})_3$, provided by diluting the organic process liquid with an alcohol solvent to about 1 weight % or more and about 10 weight % or less. The first organic process liquid and the second organic process liquid preferably each include an organic silicon compound.

Because the first organic process liquid is different from the second organic process liquid, the third organic layer 560 and the fourth organic layer 570 are formed from the first liquid on the surfaces of the first base electrode layer 122 and the second base electrode layer 132 to leave the end 220 and the end 320. Then, the second liquid is less likely to adhere onto the third organic layer 560 and the fourth organic layer 570 formed at the first time, thus allowing the first organic layer 140 and the second organic layer 150 to be formed to increase in thickness. As a result, it becomes possible to form the first organic layer 140 on the end 220 of the first base electrode layer 122 of the first external electrode 120, which is a starting point for a crack, and it becomes possible likewise to form the second organic layer 150 on the end 320 of the second base electrode layer 132 of the second external electrode 130, which is a starting point for a crack, thus making it possible for cracking to be further significantly reduced or prevented.

Experimental Example 1

Experimental Example 1 and Experimental Example 2 will be described below to confirm the advantageous effects provided by the preferred embodiments of the present. In Experimental Example 1, multilayer ceramic capacitors 100 (samples according to Example 1) were prepared by the manufacturing method according to the first preferred embodiment, and subjected to thermal stress, and the crack generation rate and the deviation rate of the multilayer ceramic capacitors were then measured.

Specifications of the multilayer ceramic capacitor 100 (Example 1) are provided below.

Size: Length L: about 1.0 mm, Width W: about 0.5 mm, Height H: about 0.5 mm
Ceramic Material: $BaTiO_3$
Capacitance: about 10 nF
Rated Voltage: about 16 V The specifications of the first external electrode 120 and the second external electrode 130 are provided below.

Base Electrode Layer: Material including Conductive Metal (Cu) and Glass Component
Thickness of Base Electrode Layer: about 30 μm at Central Portion of End Surface
Length of Extended Portion of Base Electrode Layer on First Principal Surface, Second Principal Surface, First Side Surface, and Second Side surface: about 250 μm
Plating Layer: Two Layers of Ni Plating layer (about 3 μm)+Sn plating Layer (about 3 μm)

The specifications of the first organic layer 140 and the second organic layer 150 are provided below.

Organic Layer Material: Multifunctional Alkoxysilane Si—$(C_nH_{2n+1})_3$
Thickness of Organic Layer: about 200 nm
Length of Organic Layer: about 200 μm
Length of Portion of Organic Layer covering Base Electrode Layer ($d_2$): Seven Lengths: about 5 μm; about 10 μm; about 20 μm; about 30 μm; about 50 μm; about 100 μm; and about 150 μm Further, a process for measuring the length of the portion covering the base electrode layer is described below, that is, the length from the leading end of the base electrode layer on the organic layer that covers the end of the base electrode layer to the leading end of the organic layer located in a direction opposite to the direction in which the leading end of the base electrode layer extends.

Polishing was performed from the surface in a direction that intersects at right angles with the mounting surface of the substrate, that is, the first side surface or the second side surface to a central portion (located at half the width W) of the multilayer ceramic capacitor, and thereafter, the polished cross section was observed with an SEM (electron microscope), thus measuring the length of the portion covering the base electrode layer.

The test process is described below.

The multilayer ceramic capacitor 100 was mounted by applying an LF solder paste of about 150 μm in thickness to a JEITA-land FR4 substrate of about 1.6 mm in thickness, then placing the multilayer ceramic capacitor 100 thereon, and passing the substrate through a reflow furnace at about 240° C. five times. For comparison, conventional multilayer ceramic capacitors without the first organic layer 140 and the second organic layer 150 were also similarly mounted. The number of multilayer ceramic capacitors mounted was 100 for every type.

A process for measuring the crack generation rate is described below.

The mounted multilayer ceramic capacitors were placed on a hot plate at about 240° C. to melt the solder, thus removing the multilayer ceramic capacitor from the substrate. Next, cross-section polishing was performed from the surface in a direction that intersects at right angles with the mounting surface of the substrate, that is, the first side surface or the second side surface to a central portion (located at half the width W) of the multilayer ceramic capacitor, and thereafter, the polished cross section was observed with an SEM (electron microscope), while focusing on a crack developed from the outer layer portion toward the internal electrode layer portion with an external electrode end as a starting point.

The deviation of the multilayer ceramic capacitor refers to a tombstone shape in a multiple reflow test, or a failure to achieve conduction on a solder-mounted substrate due to deviation from the substrate in a heat cycle test.

Table 1 shows therein the results of measurement in terms of the crack generation rate and of the deviation rate of the multilayer ceramic capacitor.

TABLE 1

|  | Conventional Product | 5 μm | 10 μm | 20 μm | 30 μm | 50 μm | 100 μm | 150 μm |
|---|---|---|---|---|---|---|---|---|
| Crack Generation Rate | 88% | 0% | 0% | 0% | 0% | 0% | 0% | 0% |
| Deviation Rate of Multilayer Ceramic Capacitor | 0% | 0% | 0% | 0% | 0% | 0% | 0% | 15% |

Eighty eight out of the hundred conventional multilayer ceramic capacitors without the first organic layer 140 and the second organic layer 150 were found to be cracked. None of the hundred multilayer ceramic capacitors 100 each including the first organic layer 140 and the second organic layer 150 was found to be cracked. However, in the case of the multilayer ceramic capacitor 100 including the first organic layer 140 and the second organic layer 150 where the portions covering the base electrode layers were about 150 μm in length, the multilayer ceramic capacitor was found to undergo a deviation.

In addition, the cracks, with the end 220 of the first external electrode 120 or the end 320 of the second external electrode 130 as a starting point, were all extended toward the first side surface 103 or the second side surface 104 of the laminated body 110 at an angle of about 45 degrees. The uncracked multilayer ceramic capacitors 100 each including the first organic layer 140 and the second organic layer 150 were examined closely by the SEM. Then, slight delamination was found between the first base electrode layer 122 and the Ni plating layer 123 of the first external electrode 120 and between the second base electrode layer 132 and the Ni plating layer 133 of the second external electrode 130.

Experimental Example 2

In Experimental Example 2, multilayer ceramic capacitors 500 (samples according to Example 2) prepared by the manufacturing method according to the second preferred embodiment were mounted on a substrate, and the substrate was warped, thus measuring the crack generation rate.

The specifications of the multilayer ceramic capacitor 500 (Example 2) are provided below.

Size: Length L: about 1.0 mm, Width W: about 0.5 mm, Thickness T: about 0.5 mm
Ceramic Material: $BaTiO_3$
Capacitance: about 10 nF
Rated Voltage: about 16 V The specifications of the first external electrode 120 and the second external electrode 130 are provided below.

Base Electrode Layer: Material including Conductive Metal (Cu) and Glass Component
Thickness of Base Electrode Layer: about 30 μm at Central Portion of End Surface
Length of Extended Portion of Base Electrode Layer on First Principal Surface, Second Principal Surface, First Side Surface, and Second Side surface: about 250 μm
Plating Layer: Two Layers of Ni Plating layer (about 3 μm)+Sn plating Layer (about 3 μm)

The specifications of the first organic layer 140 and the second organic layer 150 are provided below.

Organic Layer Material: Multifunctional Alkoxysilane Si—$(C_nH_{2n+1})$ 3
Thickness of Organic Layer: about 200 nm
Length of Organic Layer: about 200 μm
Length of Portion of Organic Layer covering Base Electrode Layer ($d_2$): about 30 μm The specifications of the third organic layer 560 and the fourth organic layer 570 are provided below.

Organic Layer Material: Monofunctional Silane Coupling Material of Decyltrimethoxysilane
Thickness of Organic Layer: about 3 nm at Central Portion of End Surface The test process is described below.

The multilayer ceramic capacitor 500 was mounted by applying an LF solder of about 150 μm in thickness to a JEITA-land FR4 substrate about of 40 mm in width, about 100 mm in length, about 1.6 mm in thickness, then placing the multilayer ceramic capacitor 500 thereon, and passing the substrate through a reflow furnace at about 240° C. For comparison, conventional multilayer ceramic capacitors without the first organic layer 140 and the second organic layer 150, and the multilayer ceramic capacitors 100 prepared according to Example 1 where the portions of the first organic layer 140 and the second organic layer 150 covering the base electrode layers were about 30 μm in length, were also similarly mounted. The number of substrates was 60 for every type.

Next, the substrates with the multilayer ceramic capacitors mounted thereon were subjected to warping and retaining tests. The warping and retaining test was performed by pressing a pressing jig of about 1 mm in radius R from the back surfaces of the substrates at a speed of about 1 mm/second, and retaining the about 2 mm warped substrates for about 5 seconds. The number of substrates tested was 30 for each type. The test of about 5 mm warping was also performed on 30 substrates for each type. Thereafter, the substrates tested were placed on a hot plate at about 240° C. to melt the solder, thus removing the multilayer ceramic capacitor from the substrate. Next, cross-section polishing was performed from the surface in a direction that intersects at right angles with the mounting surface of the substrate, that is, the first side surface or the second side surface to a central portion (located at half the width W) of the multilayer ceramic capacitor, and thereafter, the polished cross section was observed with an SEM (electron microscope), while focusing on a crack developed from the outer layer portion toward the internal electrode layer portion with an external electrode end as a starting point.

Table 2 shows therein the results of measurement in terms of the crack generation rate.

TABLE 2

|  | Conventional Product | Example 1 | Example 2 |
| --- | --- | --- | --- |
| Warp of 2 mm | 80% | 0% | 0% |
| Warp of 5 mm | 100% | 70% | 0% |

Most of the conventional multilayer ceramic capacitors without the first organic layer 140 and the second organic layer 150 were cracked in each case of retention with warp of about 2 mm and retention with warp of about 5 mm. On the other hand, the multilayer ceramic capacitors 100 according to Example 1, including the first organic layer 140 and the second organic layer 150 were not cracked in the case of retention with warp of about 2 mm, but cracked at about 70% in the case of retention with warp of about 5 mm. However, the multilayer ceramic capacitors 500 according to Example 2, including the first organic layer 140, the second organic layer 150, the third organic layer 560, and the fourth organic layer 570 were not cracked even in the case of retention with warp of about 5 mm.

In addition, the cracks, with the end 220 of the first external electrode 120 or the end 320 of the second external electrode 130 as a starting point, were all extended toward the first side surface 103 or the second side surface 104 of the laminated body 110 at an angle of about 45 degrees. The uncracked multilayer ceramic capacitors 500 each including the first organic layer 140, the second organic layer 150, the third organic layer 560, and the fourth organic layer 570 were examined closely by the SEM. Then, slight delamination was found between the first base electrode layer 122 and the Ni plating layer 123 of the first external electrode 120 and between the second base electrode layer 132 and the Ni plating layer 133 of the second external electrode 130.

From the foregoing results, the multilayer ceramic capacitor according to Example 2, including the first organic layer 140, the second organic layer 150, the third organic layer 560, and the fourth organic layer 570 makes delamination much more likely to be achieved between the first base electrode layer 122 and the Ni plating layer 124 of the first external electrode 120 and between the second base electrode layer 132 and the Ni plating layer 134 of the second external electrode 130, thus significantly reducing or preventing cracking, deformation, or the like in the ceramic portion and the internal electrode portion of the multilayer ceramic capacitor and providing a significant improvement in the reliability of the multilayer ceramic capacitor.

In the descriptions of the preferred embodiments of the present invention described above, various features or elements may be combined with each other. The preferred embodiments of the present invention disclosed herein should be considered by way of example in all respects, and non-limiting. The scope of the present invention is defined by the claims, but not by the foregoing descriptions, and intended to encompass all of modifications within the spirit and scope equivalent to the claims.

Figure 8:
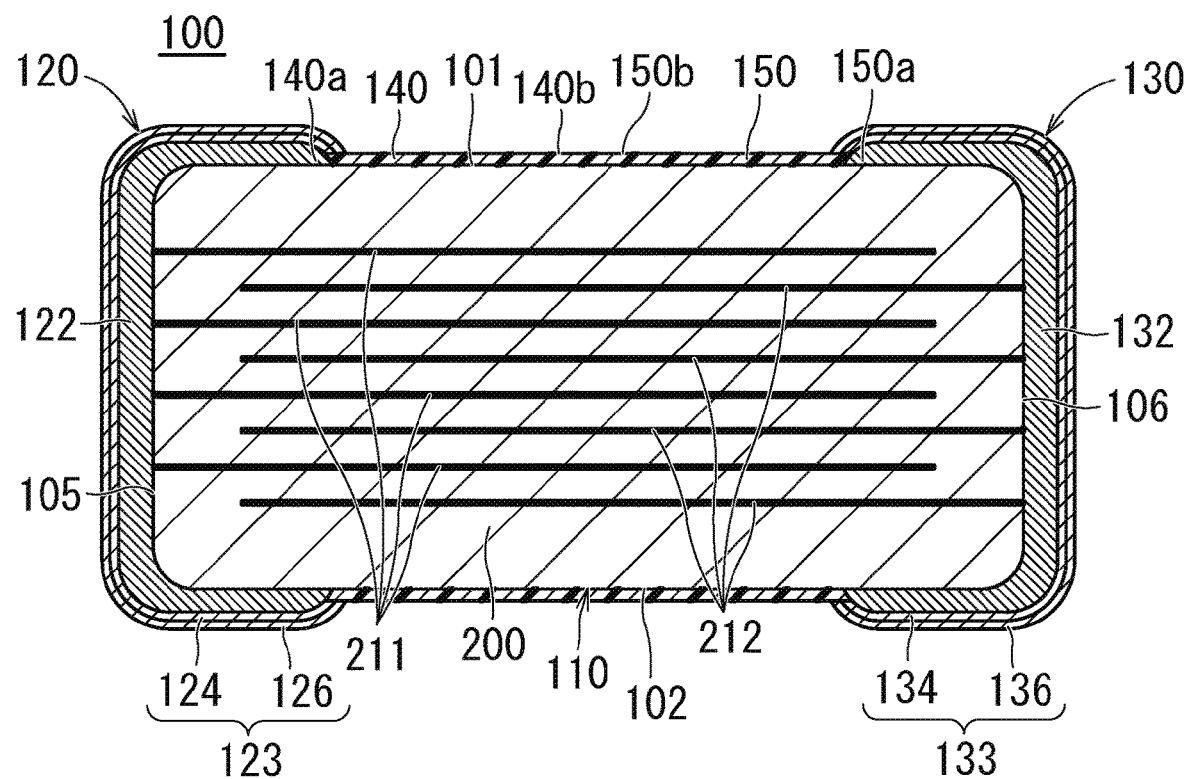
FIG. 8 is a cross-sectional view showing a modification example of a multilayer ceramic electronic component according to a preferred embodiment of the present invention.

For example, in the case of the first preferred embodiment of the present invention, there is a portion without any organic layer between the first external electrode 120 and the second external electrode 130 of the multilayer ceramic capacitor 100. However, as shown in FIG. 8, the organic layers may be located on the entire exposed surface of the laminated body 110 between the first external electrode 120 and the second external electrode 130, in such a way that the other end 140*b* of the first organic layer 140 extends to a central portion of the laminated body 110, and the other end 150*b* of the second organic layer 150 extends to the central portion of the laminated body 110, thus both defining a joint at the central portion. The same or similar features may be also provided in the case of the second preferred embodiment of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a laminated body including a plurality of laminated dielectric layers and a plurality of laminated internal electrodes, the laminated body including a first principal surface and a second principal surface opposite in a laminating direction, a first side surface and a second side surface opposite in a width direction perpendicular or substantially perpendicular to the laminating direction, and a first end surface and a second end surface opposite in a length direction perpendicular or substantially perpendicular to the laminating direction and the width direction;
a first external electrode electrically connected to the internal electrodes, and located on the first end surface, with an end extending on the first principal surface, the second principal surface, the first side surface, and the second side surface;
a second external electrode electrically connected to the internal electrodes, and located on the second end surface, with an end extending on the first principal surface, the second principal surface, the first side surface, and the second side surface;
a first organic layer located on the first principal surface, the second principal surface, the first side surface, and the second side surface, being in contact with the first external electrode; and
a second organic layer located on the first principal surface, the second principal surface, the first side surface, and the second side surface, being in contact with the second external electrode; wherein
the first external electrode includes a first base electrode layer including a conductive metal and a glass component, and a first plating layer located on the first base electrode layer;
the second external electrode includes a second base electrode layer including a conductive metal and a glass component, and a second plating layer located on the second base electrode layer;
the first organic layer includes an organic silicon compound, and covers at least an end of the first base electrode layer of the first external electrode;
the second organic layer includes an organic silicon compound, and covers at least an end of the second base electrode layer of the second external electrode;
an end of the first plating layer of the first external electrode is in contact with a surface of the first organic layer;
an end of the second plating layer of the second external electrode is in contact with a surface of the second organic layer;
at least a portion of a space between the first external electrode and the second external electrode does not include any organic layer;
a portion of the first organic layer is in contact with the laminated body and includes a dimension in the length direction from a leading end of the first base electrode layer to a leading end of the first organic layer closer to the second end surface of about 5 μm or more and about 100 μm or less; and
a portion of the second organic layer is in contact with the laminated body and includes a dimension in the length direction from a leading end of the second base electrode layer to a leading end of the second organic layer closer to the first end surface of about 5 μm or more and about 100 μm or less.

2. The multilayer ceramic electronic component according to claim 1, wherein
a dimension in the length direction is about 5 μm or more and about 100 μm or less from a leading end of the first base electrode layer on the first organic layer covering the end of the first base electrode layer of the first external electrode to a leading end of the first organic layer closer to the first end surface; and
a dimension in the length direction is about 5 μm or more and about 100 μm or less from a leading end of the second base electrode layer on the second organic layer covering the end of the second base electrode layer of the second external electrode to a leading end of the second organic layer closer to the second end surface.

3. The multilayer ceramic electronic component according to claim 1, further comprising:
a third organic layer located between the first base electrode layer of the first external electrode and the first plating layer; and
a fourth organic layer located between the second base electrode layer of the second external electrode and the second plating layer; wherein
the third organic layer covers the first base electrode layer of the first external electrode, and the third organic layer includes an end in contact with a surface of the first organic layer; and
the fourth organic layer covers the second base electrode layer of the second external electrode, and the fourth organic layer includes an end in contact with a surface of the second organic layer.

4. The multilayer ceramic electronic component according to claim 3, wherein the first organic layer and the second organic layer are larger in thickness than the third organic layer and the fourth organic layer.

5. The multilayer ceramic electronic component according to claim 3, wherein the third organic layer and the fourth organic layer include an organic silicon compound.

6. The multilayer ceramic electronic component according to claim 3 wherein at least one set of a first set of the first organic layer and the second organic layer and a second set of the third organic layer and the fourth organic layer includes multifunctional alkoxysilane Si—$(C_nH_{2n+1})_3$.

7. The multilayer ceramic electronic component according to claim 1, wherein the multilayer ceramic electronic component is a multilayer ceramic capacitor.

8. The multilayer ceramic electronic component according to claim 1, wherein the plurality of dielectric layers and the plurality of internal electrodes are laminated alternately.

9. The multilayer ceramic electronic component according to claim 1, wherein the plurality of internal electrodes include a plurality of first internal electrodes that each includes a rectangular or substantially rectangular first opposite portion, and a plurality of second internal electrodes that each includes a rectangular or substantially rectangular second opposite portion.

10. The multilayer ceramic electronic component according to claim 9, wherein the first opposite portion includes a first extended portion with an end surface exposed at the first end surface, and the second opposite portion includes a second extended portion with an end surface exposed at the second end surface.

11. The multilayer ceramic electronic component according to claim 9, wherein the first opposite portion and the second opposite portion generate an electrostatic capacitance.

12. The multilayer ceramic electronic component according to claim 1, wherein the first plating layer and the second plating layer each includes a two-layer structure.

13. The multilayer ceramic electronic component according to claim 12, wherein the two-layer structure of each of the first plating layer and the second plating layer includes a Ni layer and a Sn layer.

14. The multilayer ceramic electronic component according to claim 1, wherein the first organic layer covers an entire surface of the first base electrode layer, and the second organic layer covers an entire surface of the second base electrode layer.

* * * * *